(12) United States Patent
Brenner

(10) Patent No.: US 11,280,367 B2
(45) Date of Patent: Mar. 22, 2022

(54) SECURING ASSEMBLY HAVING COMPONENT SUPPORT HOOK

(71) Applicant: iSee Store Innovations, L.L.C., St. Louis, MO (US)

(72) Inventor: Steven Allen Brenner, Richmond Heights, MO (US)

(73) Assignee: iSee Store Innovations, L.L.C., St. Louis, MO (US)

( * ) Notice: Subject to any disclaimer, the term of this patent is extended or adjusted under 35 U.S.C. 154(b) by 0 days.

(21) Appl. No.: 16/861,389

(22) Filed: Apr. 29, 2020

(65) Prior Publication Data
US 2021/0341011 A1 Nov. 4, 2021

(51) Int. Cl.
*F16B 47/00* (2006.01)
*F16M 13/02* (2006.01)
*F16B 45/00* (2006.01)

(52) U.S. Cl.
CPC .............. *F16B 47/00* (2013.01); *F16B 45/00* (2013.01); *F16M 13/022* (2013.01)

(58) Field of Classification Search
CPC ........ F16B 47/00; F16B 47/006; F16B 45/00; F16M 13/022
USPC ...... 248/467, 683, 537, 205.5, 205.8, 206.2, 248/206.3, 309.3, 362, 363
See application file for complete search history.

(56) References Cited

U.S. PATENT DOCUMENTS

| | | | |
|---|---|---|---|
| 2,657,893 A | 11/1953 | Puckert | |
| 2,940,713 A | 6/1960 | Van Dusen | |
| 4,133,575 A * | 1/1979 | Mader | B60J 1/20 248/205.8 |
| 5,104,077 A * | 4/1992 | Liu | F16B 47/00 248/205.8 |
| 5,318,262 A | 6/1994 | Adams | |
| 6,478,271 B1 | 11/2002 | Mulholland | |
| 6,502,794 B1 | 1/2003 | Ting | |
| 6,666,420 B1 * | 12/2003 | Carnevali | F16B 47/00 248/205.8 |
| 6,669,033 B1 | 12/2003 | Lian | |
| 6,932,306 B2 * | 8/2005 | Zou | F16B 45/00 248/205.5 |
| 6,942,188 B2 | 9/2005 | Tsay | |
| 6,966,530 B2 | 11/2005 | Hsu | |
| 7,458,541 B1 | 12/2008 | Chang | |
| 7,708,245 B2 | 5/2010 | Woo | |
| 7,793,899 B2 | 9/2010 | Fan | |
| 7,850,133 B2 * | 12/2010 | Carnevali | F16B 47/00 248/205.5 |
| 8,079,557 B2 | 12/2011 | Tu | |
| 9,200,667 B1 | 12/2015 | Hsu | |
| 9,404,526 B2 | 8/2016 | Huang | |
| 9,410,571 B2 | 8/2016 | Yang | |
| 10,393,168 B2 | 8/2019 | Schaefer | |
| 2005/0072804 A1 * | 4/2005 | Brown | A45F 3/20 222/175 |
| 2008/0308693 A1 | 12/2008 | Kim | |

(Continued)

*Primary Examiner* — Muhammad Ijaz

(74) *Attorney, Agent, or Firm* — The Small Patent Law Group LLC; Joseph M. Butscher

(57) ABSTRACT

A locking member is configured to couple to a suction cup and a suction securing nut. The locking member includes a locking ring, and a component support hook extending from the locking ring. The component support hook is configured to support at least a portion of a component.

22 Claims, 15 Drawing Sheets

(56) References Cited

U.S. PATENT DOCUMENTS

| | | |
|---|---|---|
| 2014/0374553 A1* | 12/2014 | Park .................... F16B 47/00 248/205.5 |
| 2015/0240862 A1* | 8/2015 | Shi ..................... F16B 47/00 248/205.8 |
| 2015/0369276 A1 | 12/2015 | Balmer |
| 2016/0201714 A1 | 7/2016 | Zhang |
| 2016/0215813 A1 | 7/2016 | Huang |

* cited by examiner

SECURING ASSEMBLY HAVING COMPONENT SUPPORT HOOK

FIELD OF EMBODIMENTS OF THE DISCLOSURE

Embodiments of the present disclosure generally relate to securing assemblies, which may be used to removably secure to a structure, and more particularly to securing assemblies having component support hooks.

BACKGROUND OF THE DISCLOSURE

Suction cups may be used to adhere to surfaces of structures. For example, a suction cup may removably secure to a glass surface of a door of a refrigerated compartment.

One or more suction cups may be used to secure a component, such as a product display system, to a surface of a structure, such as a glass door of a refrigerated compartment. However, various known suction cups may move or slide relative to the surface of the component, such as if a force of sufficient magnitude is applied to the suction cup. For example, if a product display system retains a sufficient amount of products, the overall weight of the product display system may cause the suction cups to slide down the surface of the structure, or even dislodge therefrom.

Further, suction cups are typically not configured to support certain components, such as decorations, wiring, draped materials, and/or the like, therefrom.

SUMMARY OF THE DISCLOSURE

A need exists for a robust suction cup that is configured to support components therefrom. Further, a need exists for a suction cup that supports a component therefrom, and provides a reliable and strong coupling to a surface of a structure.

With those needs in mind, certain embodiments of the present disclosure provide a locking member configured to couple to a suction cup and a suction securing nut. The locking member includes a locking ring, and a component support hook extending from the locking ring. The component support hook is configured to support at least a portion of a component. In at least one embodiment, the locking ring and the component support hook are integrally formed together to provide a single, unitary, monolithic structure.

In at least one embodiment, the component support hook includes an extension beam, and a tab upwardly extending from the extension beam. As an example, the extension beam is configured to extend below an underside of the suction securing nut. As another example, the extension beam is configured to extend above the suction securing nut. In at least one embodiment, the tab upwardly cants from a distal end of the extension beam at a ninety degree angle. In at least one example, the extension beam is configured to space the tab a distance in front of a front surface of the suction securing nut.

The tab may include a support passage extending between and through a front surface and a rear surface of the tab. An interior surface of the extension beam may be arcuate.

In at least one embodiment, the tab includes a base upwardly extending from the extension beam, and a tip connected to the base. The tab may taper down from the base to the tip.

Certain embodiments of the present disclosure provide a securing assembly configured to removably secure to a surface of a structure. The securing assembly includes a suction cup, a suction securing nut coupled to the suction cup, and a locking member coupled to the suction cup and the suction cup. The locking member includes a locking ring, and a component support hook extending from the locking ring. The component support hook is configured to support at least a portion of a component.

Certain embodiments of the present disclosure provide a method of forming a locking member that is configured to couple to a suction cup and a suction securing nut. The method includes extending a component support hook from a locking ring. The component support hook is configured to support at least a portion of a component.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a securing assembly that includes a suction cup that may be secured to a bracket via a threaded knob that passes through an opening of the main body and is accepted by a nut. The tightening of the nut may act to pull the main body (or a portion thereof) on to the suction cup, and may serve to increase the suction provided by the suction cup. The nut and threaded knob may be coupled via a ratcheting or other torque limiting mechanism to prevent over-tightening.

In at least one embodiment, the securing assembly includes a suction cup, a locking member, and a suction securing nut. The locking member includes a locking ring disposed between the suction cup and the suction securing nut. As the suction securing nut is tightened, the suction securing nut exerts a force into the locking ring, which causes the suction cup to exert an increased securing force into a surface of a component, thereby minimizing, preventing, or otherwise reducing movement of the securing assembly in relation to the surface of the component.

The locking member also includes a component support hook extending from the locking ring. The component support hook is integrally formed with the locking ring. For example, the locking ring and the component support hook may be integrally molded and formed to provide a single, monolithic structure. Components may be hung from the component support hook. For example, the component support hook is configured to support various components therefrom, such as decorations (for example, garland, holiday lighting, etc.), wiring, draped materials, lanyards, and/or the like.

Certain embodiments of the present disclosure provide a locking member configured to couple to a suction cup and a suction securing nut. The locking member includes a locking ring, and a component support hook extending from the locking ring. The component support hook is configured to support at least a portion of a component. For example, a portion of the component (such as string(s), rope(s), cable(s), wiring, vine(s), branch(es), or the like) may be hung from the component support hook.

Figure 1:
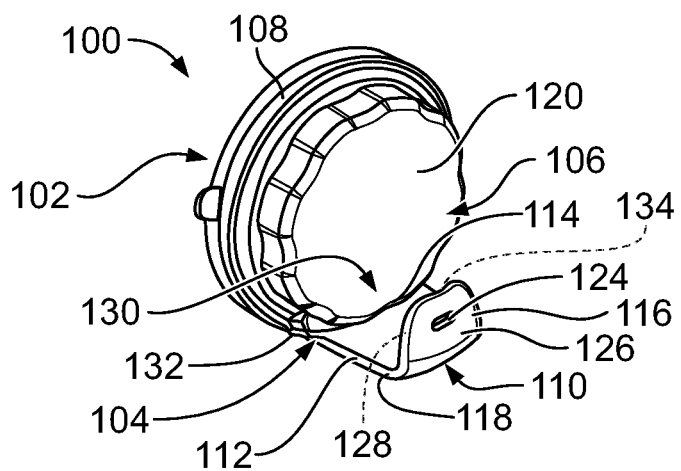
FIG. 1 illustrates a perspective front view of a securing assembly, according to an embodiment of the present disclosure.
Figure 2:
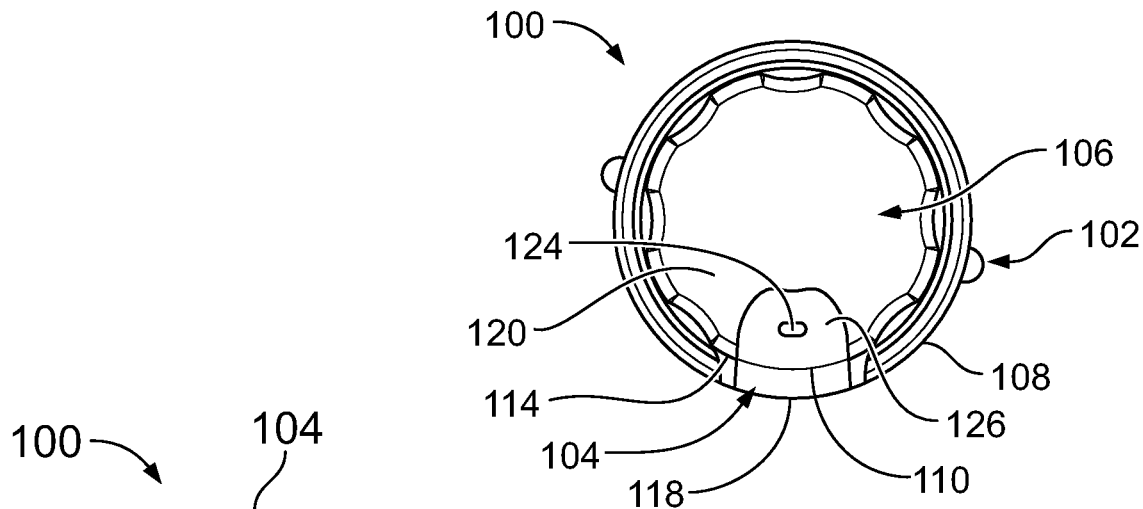
FIG. 2 illustrates a front view of the securing assembly of FIG. 1.
Figure 3:
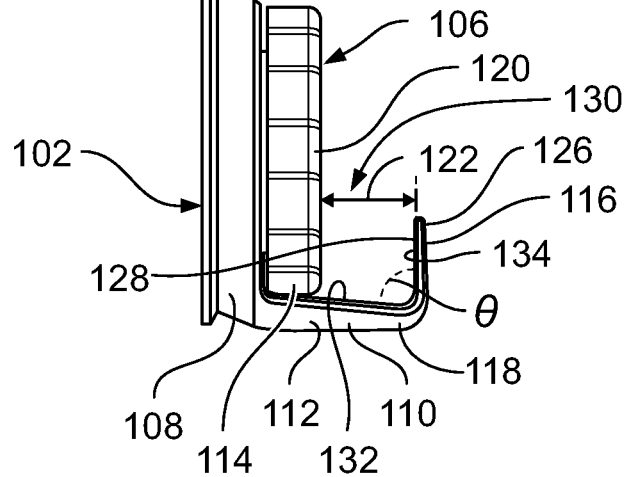
FIG. 3 illustrates a lateral view of the securing assembly of FIG. 1.

FIG. 1 illustrates a perspective front view of a securing assembly 100, according to an embodiment of the present disclosure. FIG. 2 illustrates a front view of the securing assembly 100 of FIG. 1. FIG. 3 illustrates a lateral view of the securing assembly 100 of FIG. 1. Referring to FIGS. 1-3, the securing assembly 100 includes a suction cup 102 that couples to a locking member 104, which, in turn, couples to a suction securing nut 106.

The locking member 104 includes a locking ring 108 and a component support hook 110 outwardly extending from the locking ring 108. In at least one embodiment, the locking ring 108 is integrally formed with the component support hook 110 to provide a single, unitary, monolithic structure. For example, the locking member 104 may be integrally molded and formed as a single piece of plastic. Optionally, the locking member 104 may be formed of other materials, such as metals.

The component support hook 110 outwardly extends from the locking ring 108, such as in a forward direction. The locking ring 108 includes an extension beam 112 that extends below an underside 114 of the suction securing nut 106. Optionally, the extension beam 112 may extend over an upper segment of the suction securing nut 106 (such as shown in FIGS. 33-39). The extension beam 112 connects to a tab 116 that extends from the extension beam 112. For example, the tab 116 is upwardly canted from the extension beam 112. As shown, the tab 116 upwardly extends from a distal end 118 of the extension beam 112 at an angle θ, which may be 90 degrees. Optionally, the angle θ may be less or greater than 90 degrees. For example, the angle θ may be between 45 degrees and 90 degrees. As another example, the angle θ may be between 90 degrees and 135 degrees.

The extension beam 112 extends the tab 116 outwardly away from a front surface 120 of the suction securing nut 106. In particular, the tab 116 is spaced a distance 122 in front of the front surface 120. The distance 122 may be 6 inches or less, for example. Optionally, the distance 122 may be greater than 6 inches.

A support passage 124 may be formed through a portion of the tab 116. The support passage 124 may be a hole or opening that extends between and through a front surface 126 and a rear surface 128 of the tab 116. The support passage 124 is configured to receive and retain a portion of a component, such as a string, clip, hook, barb, or the like, so that the component may dangle or otherwise hang from the tab 116. Optionally, the component support hook 110 may not include the support passage 124.

The extension beam 112 and the tab 116 define a support area 130 therebetween. In particular, the support area 130 is defined between an interior surface 132 of the extension beam 112 and an interior surface 134 of the tab 116. A component, such as a portion of a decoration (for example, garland, holiday lighting, etc.), wiring, a draped material, a lanyard, and/or the like, may be hung from the component support hook 110 within the support area 130. The extension beam 112 and the tab 116 cooperate to ensure that the component does not slip forward and off the component support hook 110.

Figure 4:
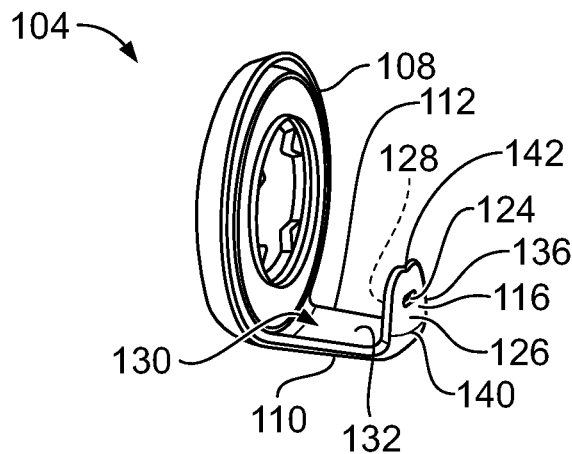
FIG. 4 illustrates a perspective front view of a locking member, according to an embodiment of the present disclosure.
Figure 5:
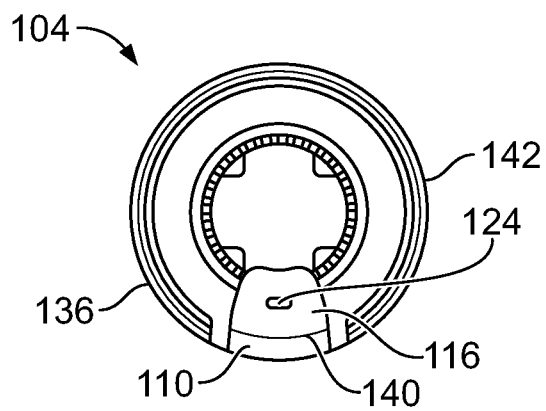
FIG. 5 illustrates a front view of the locking member of FIG. 4.
Figure 6:
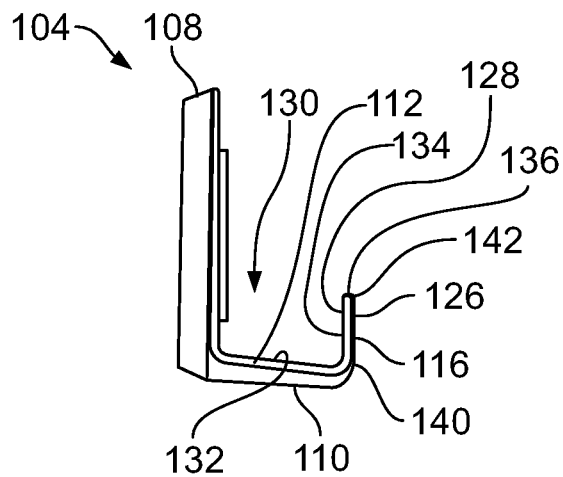
FIG. 6 illustrates a lateral view of the locking member of FIG. 4.

FIG. 4 illustrates a perspective front view of the locking member 104, according to an embodiment of the present disclosure. FIG. 5 illustrates a front view of the locking member 104 of FIG. 4. FIG. 6 illustrates a lateral view of the locking member 104 of FIG. 4. Referring to FIGS. 4-6, the interior surface 132 of the extension beam 112 may be arcuate. For example, the interior surface 132 may have a radius of curvature that conforms to, or substantially conforms to (such as within 5 degrees of) an outer circumference of the locking ring 108. In this manner, the interior surface 132 may have a curvature that is configured to cradle a portion of a component (such as a string, wire, cable, or the like). Optionally, the interior surface 132 may be flat.

The tab 116 may include blunted, rounded exterior edges 136 that are not susceptible to undesirably snagging portions of a component, for example. The tab 116 includes a base 140 that upwardly extends from the extension beam 112. The base 140 connects to an exposed tip 142. The base 140 may be wider than the tip 142. In general, the tab 116 may taper down from the base 140 toward the tip 142. The tapered nature of the tab 116 reduces a potential of the tab 116 undesirably snagging portions of a component. Alternatively, the tab 116 may not be tapered as shown.

Figure 7:
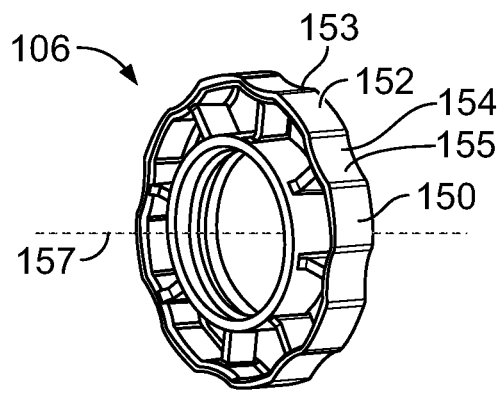
FIG. 7 illustrates a perspective rear view of a suction securing nut, according to an embodiment of the present disclosure.
Figure 8:
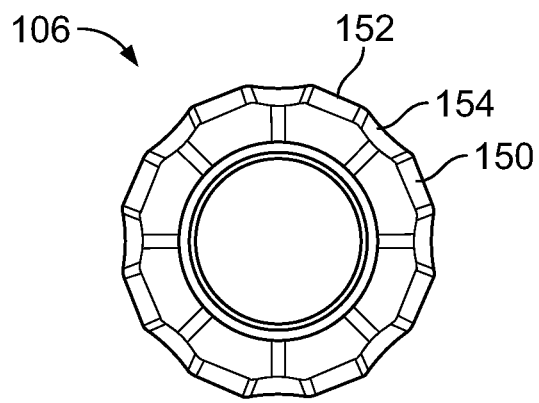
FIG. 8 illustrates a front view of the suction securing nut of FIG. 7.
Figure 9:
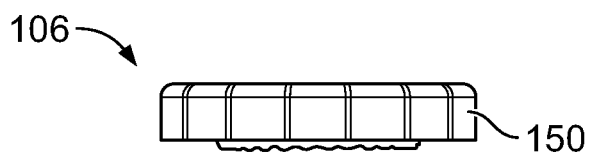
FIG. 9 illustrates a lateral view of the suction securing nut of FIG. 7.

FIG. 7 illustrates a perspective rear view of the suction securing nut 106, according to an embodiment of the present disclosure. FIG. 8 illustrates a front view of the suction securing nut 106 of FIG. 7. FIG. 9 illustrates a lateral view of the suction securing nut 106 of FIG. 7. Referring to FIGS. 7-9, in at least one embodiment, the suction securing nut 106 includes a tactile outer perimeter 150 including a regularly alternating series of protuberances 152 and indentations 154. The protuberances 152 and indentations 154 provide tactile, ergonomic gripping features that allow an individual to easily and readily grasp and rotate the suction securing nut 106. Each of the protuberances 152 and indentations 154 may have a radius of curvature. For example, the protuberances 152 may have a first radius of curvature 153 (such as a curvature that is outwardly bowed away from a central axis 157 of the suction securing nut 106), and the indentations 154 may have a second radius of curvature 155 (such as a curvature that is inwardly bowed toward the central axis 157), which may be opposite the first radius of curvature, thereby providing the rounded peaks and valleys of the protuberances 152 and indentations 154, respectively. Alternatively, the suction securing nut 106 may not include the tactile outer perimeter 150. Instead, the outer perimeter may be smooth without indentations and protuberances.

Figure 10:
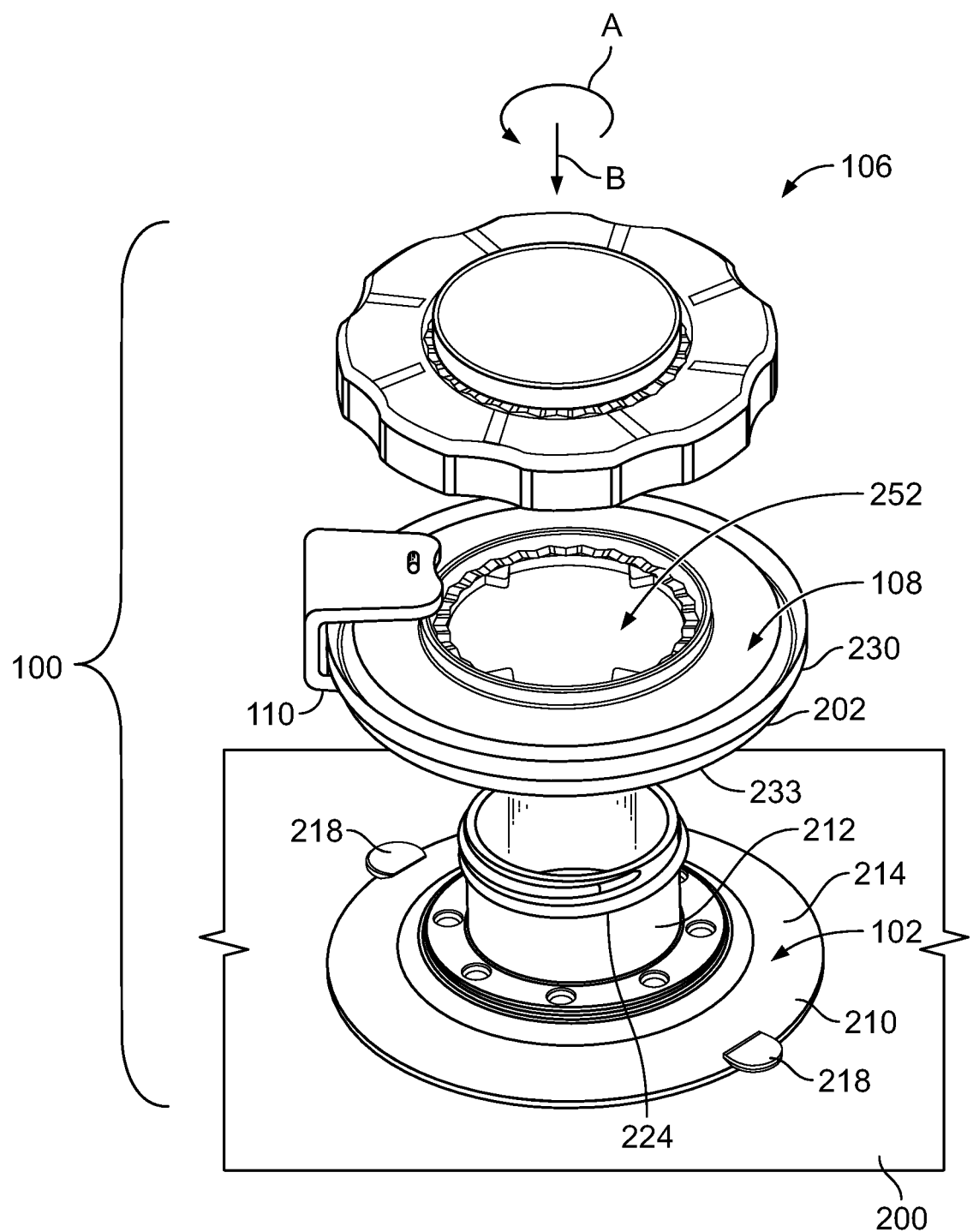
FIG. 10 illustrates a perspective exploded view of a securing assembly, according to an embodiment of the present disclosure.

FIG. 10 illustrates a perspective exploded view of the securing assembly 100, according to an embodiment of the present disclosure. The suction cup 102 is configured to directly couple to a structure 200, such as a panel, wall, beam, or other such structure. The locking ring 108 of the locking member 104 couples to the suction cup 102. The suction securing nut 106 couples to the locking ring 108 and the suction cup 102. Optionally, the locking ring 108 may be a non-ring like structure, such as one or more panels, or the like.

As shown, the locking ring 108 is disposed between the suction cup 102 and the suction securing nut 106. A portion of the locking ring 108 (such as a beveled rim 232) is configured to be urged into a portion of the suction securing nut 106 (such as an annular lip 214 of a suctioning base 210) as the suction securing nut 106 is tightened in relation to the suction cup 102. In at least one embodiment, an intermediate structure, such as a portion of a bracket or the like, may be disposed between the suction securing nut 106 and the locking ring 108, and/or the locking ring 108 and the suction cup 102.

Figure 11:
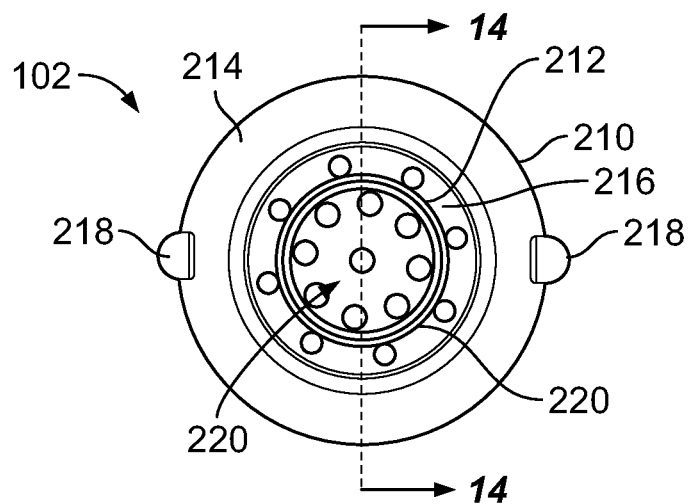
FIG. 11 illustrates a top view of a suction cup, according to an embodiment of the present disclosure.
Figure 12:
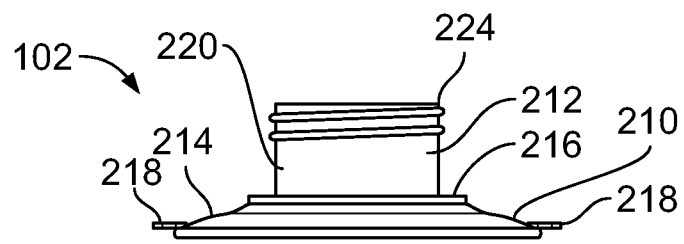
FIG. 12 illustrates a lateral view of the suction cup.
Figure 13:
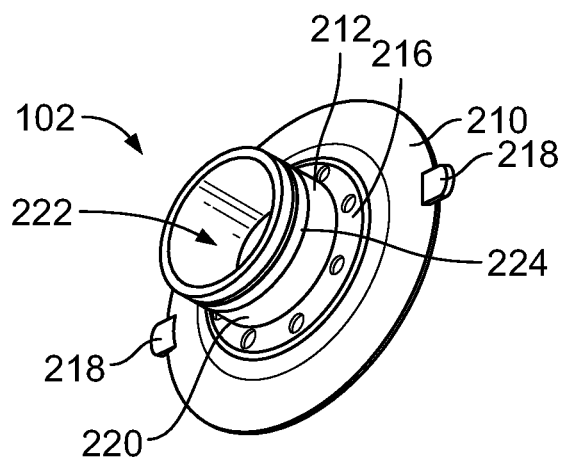
FIG. 13 illustrates a perspective top view of the suction cup.
Figure 14:
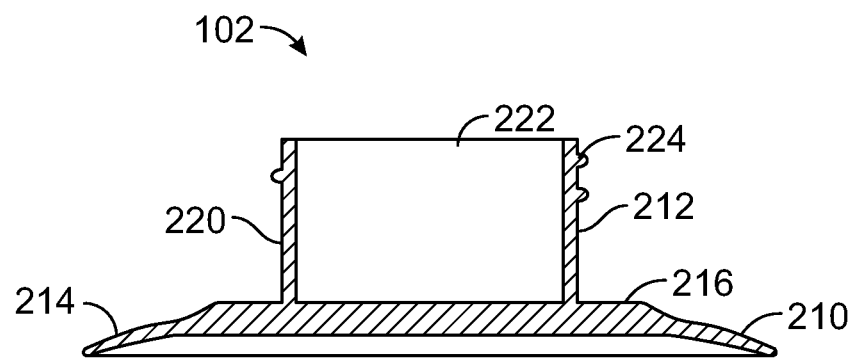
FIG. 14 illustrates a cross-sectional view of the suction cup through line 14-14 of FIG. 11.
Figure 15:
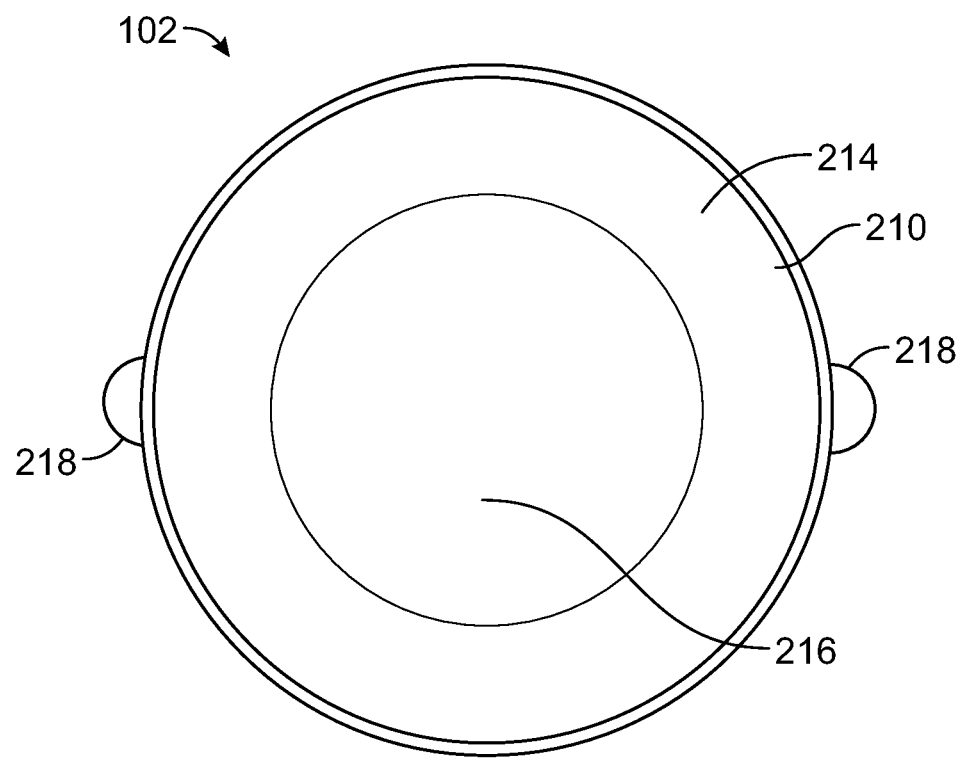
FIG. 15 illustrates a bottom view of the suction cup.

FIG. 11 illustrates a top view of the suction cup 102, according to an embodiment of the present disclosure. FIG. 12 illustrates a lateral view of the suction cup 102. FIG. 13 illustrates a perspective top view of the suction cup 102. FIG. 14 illustrates a cross-sectional view of the suction cup 102 through line 14-14 of FIG. 11. FIG. 15 illustrates a bottom view of the suction cup 102.

Referring to FIGS. 11-15, the suction cup 102 includes a suctioning base 210 integrally connected to a stem 212 extending upwardly from the suctioning base 210. The suctioning base 210 may include an outer annular lip 214 surrounding a flattened interior circular body 216. Pull tabs 218 may extend radially outward from outer edges of the annular lip 214. The pull tabs 218 are configured to be pulled outwardly from a surface to remove the suction cup 102 therefrom.

The stem 212 includes a cylindrical shaft 220 surrounding a central channel 222 that extends to the suctioning base 210. An outer surface of the shaft 220 may include threads 224 that are configured to threadably engage interior threads of the suction securing nut 106 (shown in FIG. 10).

Figure 16:
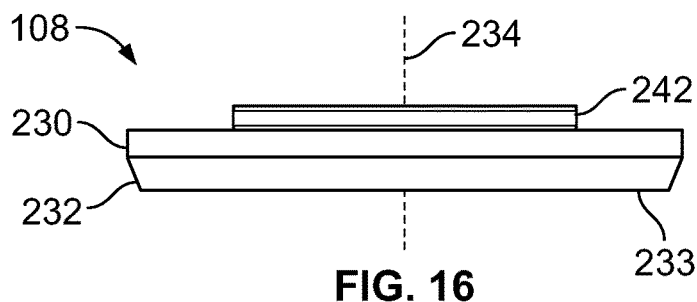
FIG. 16 illustrates a lateral view of a locking ring, according to an embodiment of the present disclosure.
Figure 17:
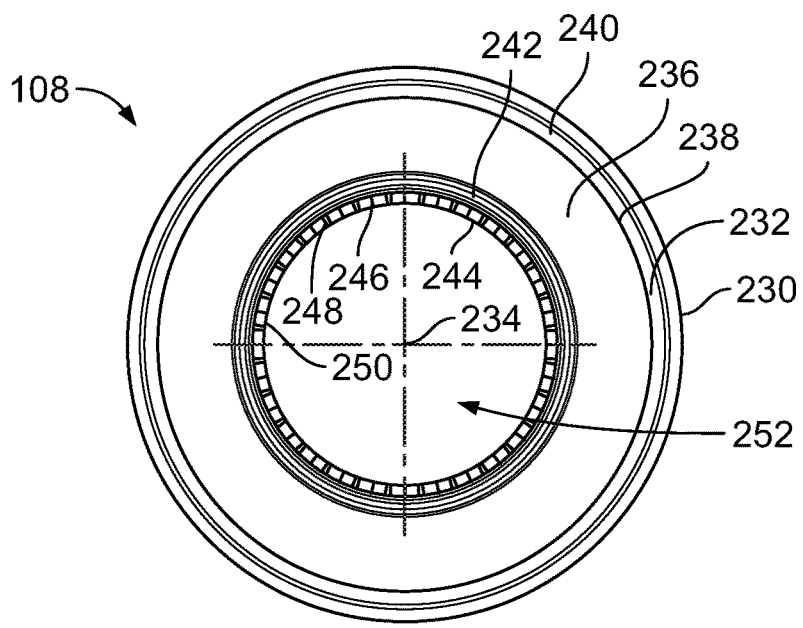
FIG. 17 illustrates a top view of the locking ring.
Figure 18:
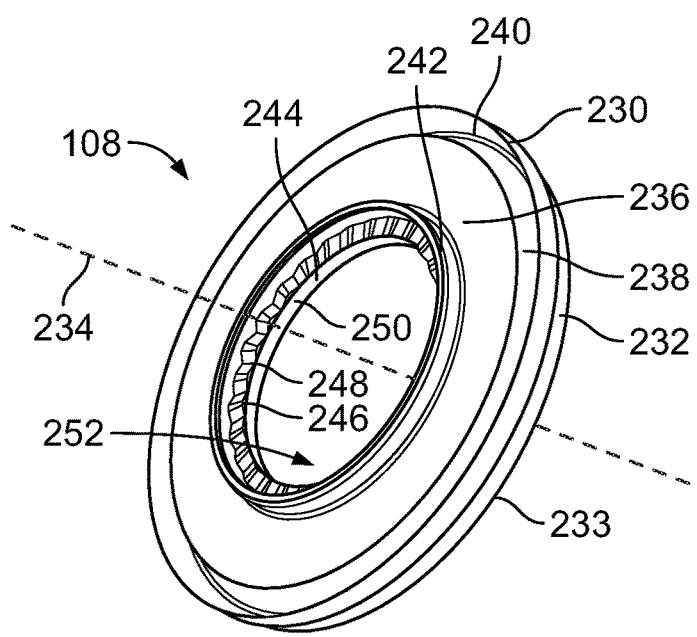
FIG. 18 illustrates a perspective top lateral view of the locking ring.

FIG. 16 illustrates a lateral view of the locking ring 108, according to an embodiment of the present disclosure. FIG. 17 illustrates a top view of the locking ring 108. FIG. 18 illustrates a perspective top lateral view of the locking ring 108. For the sake of clarity, the component support hook 110 (shown in FIGS. 1-6) is not shown in FIGS. 16-18.

Referring to FIGS. 16-18, the locking ring 108 includes an annular outer rim 230 and a beveled rim 232 extending downwardly from the outer rim 230. The beveled rim 232 inwardly cants from the outer rim 230 towards a central axis 234 of the locking ring 108. The inward cant angle of the beveled rim 232 may be greater or less than shown.

An inboard support base 236 connects to an inner diameter of the beveled rim 232 through an interior rim 238. The interior rim 238 may be coaxial with the outer rim 230. An interior groove 240 is formed between the outer rim 230, the beveled rim 232, and the interior rim 238.

An interior diameter of the inboard support base 236 connects to an interior upstanding annular wall 242, which upwardly extends from the support base 236. An interior ledge 244 inwardly extends from the annular wall 242 towards and about the central axis 234. The interior ledge 244 may be within one or more planes that are parallel to a plane of an upper surface of the support base 236. The interior ledge 244 may be serrated, and include a plurality of alternating peaks or teeth 246 and valleys or recesses 248 extending therearound. An interior edge 250 defines an internal circular passage 252. Alternatively, the interior ledge 244 may be smooth and flat, instead of serrated.

Referring to FIGS. 10-18, the locking ring 108 fits over the suction cup 102, such that the stem 212 passes through the passage 252 of the locking ring 108. A bottom edge 233 of the beveled rim 232 abuts into an upper surface of the annular lip 214 of the suctioning base 210.

Figure 19:
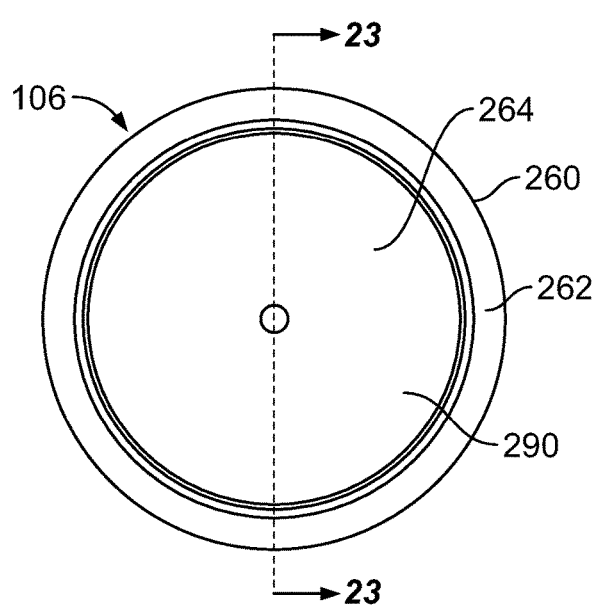
FIG. 19 illustrates a top view of a suction securing nut, according to an embodiment of the present disclosure.
Figure 21:
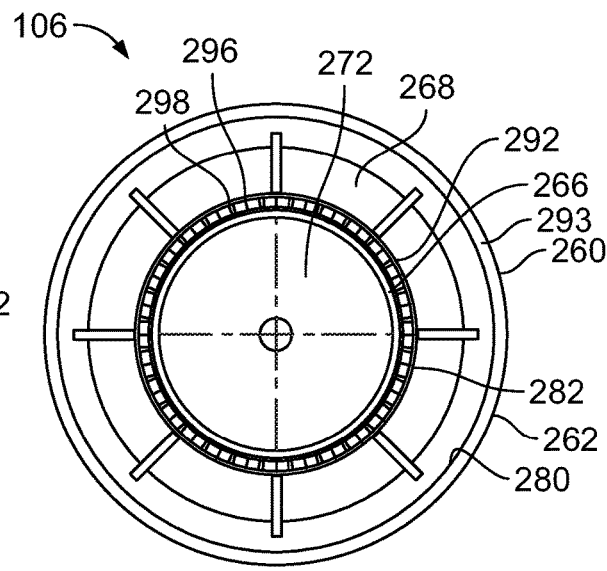
FIG. 21 illustrates a bottom view of the suction securing nut.
Figure 20:
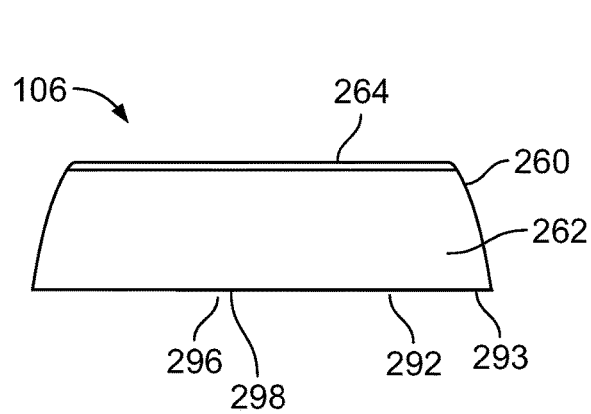
FIG. 20 illustrates a lateral view of the suction securing nut.
Figure 22:
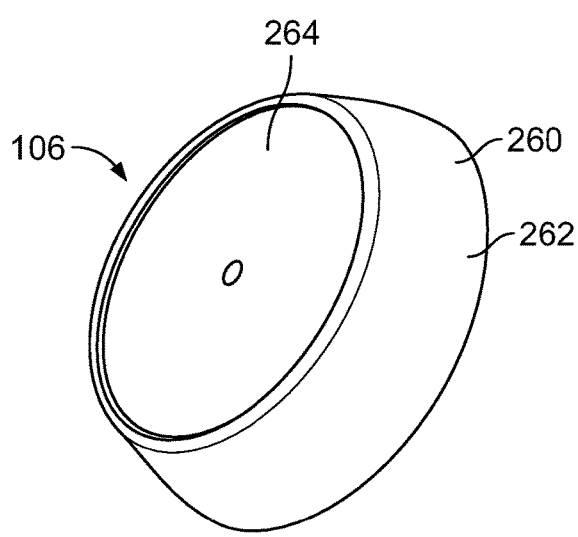
FIG. 22 illustrates a perspective top view of the suction securing nut.
Figure 23:
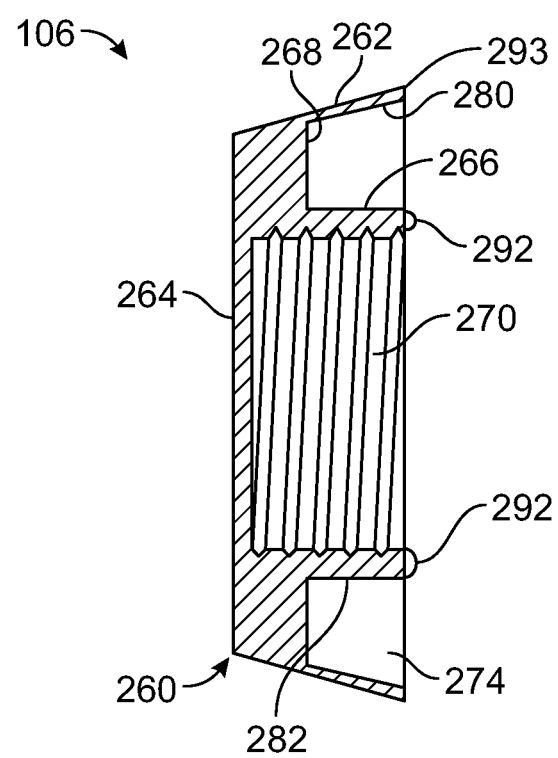
FIG. 23 illustrates a cross-sectional view of the suction securing nut through line 23-23 of FIG. 19.

FIG. 19 illustrates a top view of the suction securing nut 106, according to an embodiment of the present disclosure. FIG. 20 illustrates a lateral view of the suction securing nut 106. FIG. 21 illustrates a bottom view of the suction securing nut 106. FIG. 22 illustrates a perspective top view of the suction securing nut 106. FIG. 23 illustrates a cross-sectional view of the suction securing nut 106 through line 23-23 of FIG. 19.

Referring to FIGS. 19-23, the suction securing nut 106 is shown having a smooth outer perimeter. However, the suction securing nut 106 may have the tactile outer perimeter 150, as shown in FIGS. 7-9.

The suction securing nut 106 includes an outer shroud 260 having an outer circumferential wall 262 connected to an outer cap 264. An interior connecting tube 266 extends inwardly from an interior surface 268 of the cap 264. The connecting tube 266 includes an interior threaded surface 270 surrounding a central chamber 272. An outer channel 274 is defined between an interior surface 280 of the wall 262 and an outer surface 282 of the connecting tube 266. Alternatively, the stem 212 of the suction cup 102 may include an interior threaded surface that threadably receives and engages an outer threaded surface of the connecting tube 266 of the suction securing nut 106.

An outer surface 290 of the cap 264 may be configured to support one or more graphics, such as advertisements, information, or the like. For example, a graphics display may be formed on the outer surface 290 of the cap 264. In at least one embodiment, graphics displays may be directly formed, etched, written, adhesively secured, and/or the like onto the outer surface 290 of the cap 264. In at least one other embodiment, a clear pocket may be formed over the outer surface 290, and the graphics display may be formed on a sheet of plastic, paper, or the like that is inserted between the outer surface 290 and an interior surface of the clear pocket.

As shown, a lower edge 292 of the interior connecting tube 266 may extend below a lower surface 293 of the outer circumferential wall 262. The lower surface 293 may be serrated and include a plurality of alternating peaks or teeth 296 and valleys or recesses 298 extending therearound. The lower surface 293 of the interior connecting tube 266 is configured to couple to the interior ledge 244 of the locking ring 108 (shown in FIGS. 16-18), such that the peaks 296 and valleys 298 of the connecting tube 266 engage the peaks 246 and valleys 248 of the interior ledge 244 of the locking ring 108, thereby forcing the locking ring 108 into the suction cup 102. Alternatively, the lower surface 293 may be smooth and flat, instead of serrated.

Figure 24:
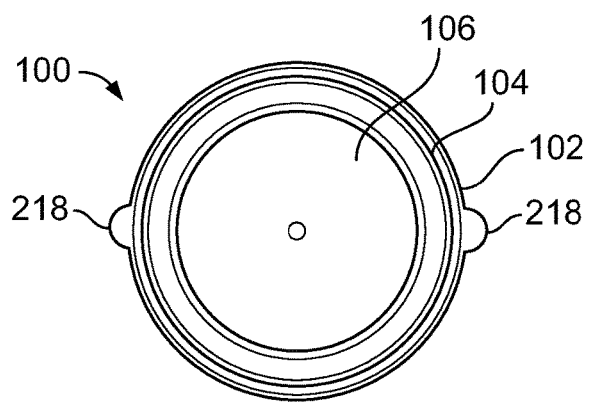
FIG. 24 illustrates a top view of the securing assembly.
Figure 26:
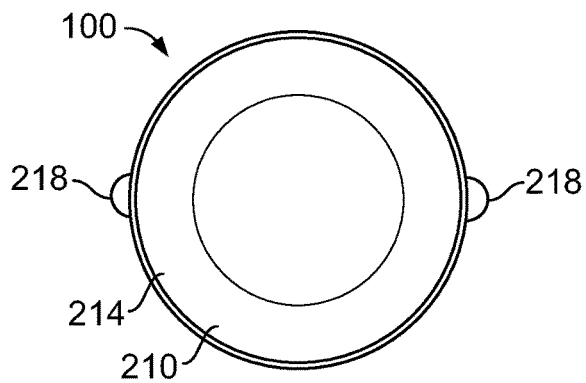
FIG. 26 illustrates a bottom view of the securing assembly.
Figure 25:
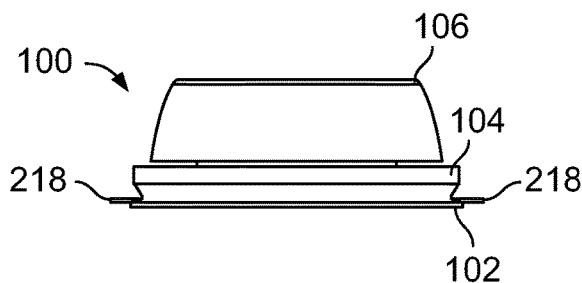
FIG. 25 illustrates a lateral view of the securing assembly.
Figure 27:
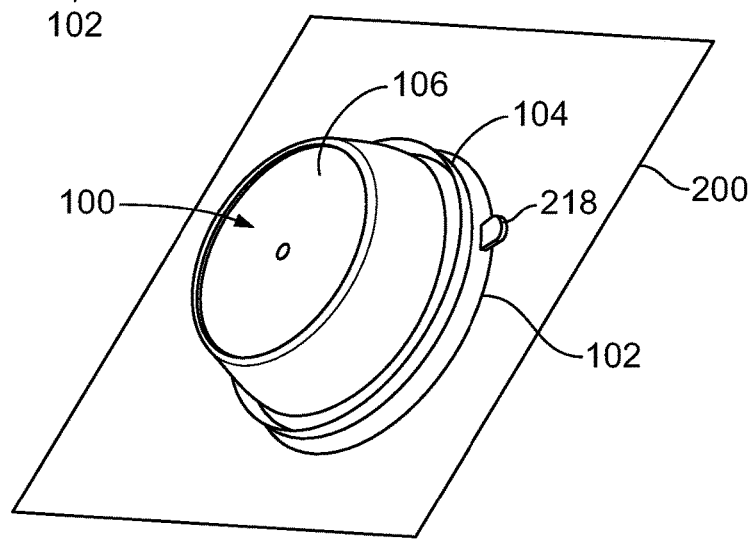
FIG. 27 illustrates a perspective view of the securing assembly secured to a structure, according to an embodiment of the present disclosure.

FIG. 24 illustrates a top view of the securing assembly 100. FIG. 25 illustrates a lateral view of the securing assembly 100. FIG. 26 illustrates a bottom view of the securing assembly 100. FIG. 27 illustrates a perspective view of the securing assembly 100 secured to the structure 200. For the sake of clarity, the component support hook 110 is not shown in FIGS. 24-27.

Referring to FIGS. 1-27, after the locking ring 108 has been coupled to the suction cup 102, as described above, the suction securing nut 106 is axially aligned over the stem 212 of the suction cup 102. The suction securing nut 106 is then urged onto the suction cup 102 such that the interior threaded surface 270 of the connecting tube 266 threadably engages the threads 224 of the stem 212. The suction securing nut 106 is then rotated in a securing direction A relative to the suction cup 102. As the suction securing nut 106 continues to be threaded in the securing direction A, the lower ledge 292 of the interior connecting tube 266 is forced into the interior ledge 244 of the locking ring 108, thereby forcing the locking ring downwardly towards the suction cup 102 in the direction of arrow B. The engagement of the alternating peaks and valleys of the lower ledge 292 and the interior ledge 244 may axially secure the suction securing nut 106 with respect to the locking ring 108 (such as via the peaks 296 of the lower ledge 292 mating into reciprocal valleys 248 of the interior ledge 244, and the peaks 246 of the interior ledge 244 mating into reciprocal valleys 298 of the lower ledge 292), so as to reduce slippage therebetween. As the suction securing nut 106 is tightened with respect to the stem 212, the bottom edge 233 of the beveled rim 232 of the locking ring 108 is forced into the annular lip 214 of the suctioning base 210, which causes the annular lip 214 to flatten. The flattening of the annular lip 214 provides a vacuum between the structure 200 and the suction cup 102. The locking ring 108 locks the suction cup 102 to the structure 200 via engagement with the suction securing nut 106. The suction securing nut 106 forces the locking ring 108 into the annular lip 214, flattening the annular lip 214 and forming a vacuum between the suction cup 102 and the structure 200, which forms a robust, strong, and reliable connection therebetween.

In order to remove the securing assembly 100 from the structure 200, the suction securing nut 106 is rotated in a direction that is opposite to the securing direction A (optionally, the securing direction A and the opposite direction may be reversed). As the suction securing nut 106 disengages from the stem 212 of the suction cup 102, the suction securing nut 106 disengages from the locking ring 108. As such, the force exerted by the locking ring 108 into the annular lip 214 decreases. The pull tabs 218 may then be pulled away from the structure 200, thereby removing the suction cup 102 therefrom.

As described herein, the suction cup 102, the locking member 104, and the suction securing nut 106 may form the securing assembly 100. As the connecting tube 266 is rotated into a securing position with the stem 212, the locking ring 108 is forced into the annular lip 214 of the suctioning base 210, which greatly increases the suctioning force exerted by the suctioning base 210 (such as by drawing air out of the interface between the structure 200 and the suctioning base 210 to create a vacuum), thereby increasing the securing force between the securing assembly 100 and the surface of the structure 200. It has been found that by including the locking ring 108 in the securing assembly 100, increased suction retaining force is achieved with the surface of the component, such as a glass surface of a refrigerated compartment door. The resulting suctioning force achieved by operation of the locking ring 108 with the suction securing nut 106 and the suction cup 102 greatly exceeds that of a standard suction cup that is merely linearly pressed into a surface of a component.

Figure 28:
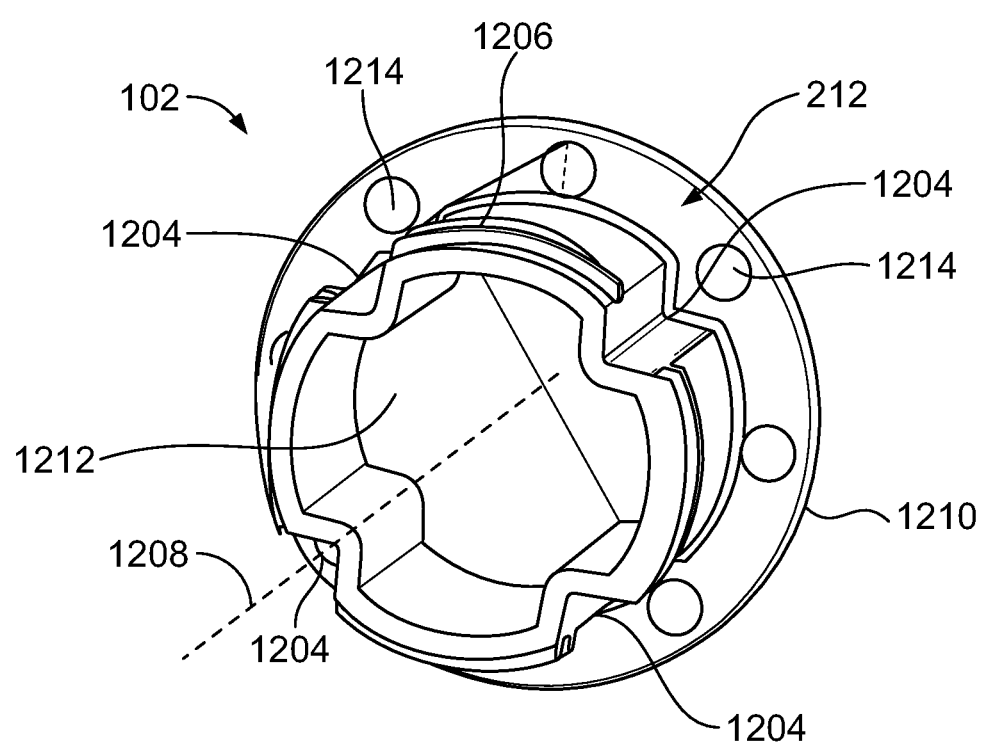
FIG. 28 illustrates a perspective top view of a stem of a suction cup, according to an embodiment of the present disclosure.

FIG. 28 illustrates a perspective top view of a stem 212 of a suction cup 102, according to an embodiment of the present disclosure. Keying members 1204 may be formed through the stem 212. Outer surfaces of the stem 212 may include threads 1206, as described above. The keying members 1204 may be channels, indentations, divots, recessed areas, notches, slots, or the like, formed in an outer surface of the stem 212. Each keying member 1204 may be formed along a height of the stem 212 and may be parallel to a central axis 1208 of the stem 212. As shown, four evenly-spaced keying members 1204 are shown. Alternatively, more or less keying members than shown may be used.

The keying members 1204 provide alignment keys that are configured to receive reciprocal structures formed on a component, such as an accessory, bracket or the like, in order to maintain the component in a desired position. For example, securing mounts may include inwardly directed tabs extending into the passages. The tabs may be retained within the keying members 1204 to securely maintain a product holder system, for example, at a desired orientation. Any of the embodiments described herein may include the keying members 1204. Optionally, embodiments may not include the keying members 1204.

Additionally, a flange 1210 radially extends from a base 1212 of the stem 212. The flange 1210 may include one or more holes 1214 formed therethrough. More or less holes than shown may be used. A suctioning base (such as the suctioning base 210) may be secured over or otherwise onto the flange 1210. The holes 1214 are configured to allow the flexible material of the suctioning base to flow around and through the flange 1210, thereby providing an increased retaining interface, as well as providing a greater degree of flexibility to the suctioning base. Any of the embodiments described herein may include the holes 1214. Optionally, embodiments may not include the holes 1214.

Figure 29:
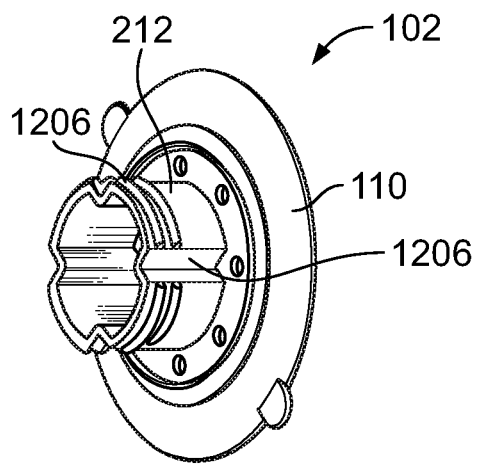
FIG. 29 illustrates a perspective view of a suction cup, according to an embodiment of the present disclosure.
Figure 30:
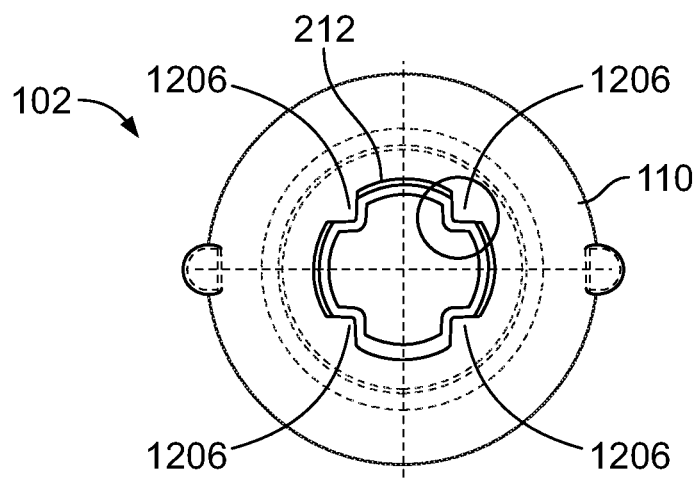
FIG. 30 illustrates a top view of a suction cup, according to an embodiment of the present disclosure.

FIG. 29 illustrates a perspective view of the suction cup 102, according to an embodiment of the present disclosure. FIG. 30 illustrates a top view of the suction cup 102. Referring to FIGS. 29 and 30, as shown, the suctioning base 210 is secured to the stem 212. The threads 1206 are formed on an outer surface of the stem 212, while the keying members 1204 are formed through portions of the stem 212.

Figure 31:
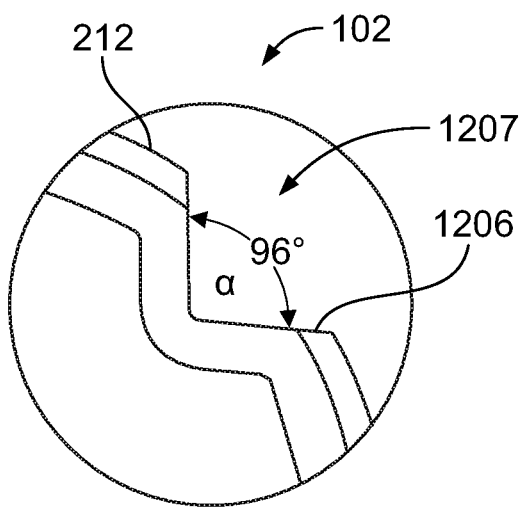
FIG. 31 illustrates a top view of a keying member of a suction cup, according to an embodiment of the present disclosure.

FIG. 31 illustrates a top view of a keying member 1206 of the suction cup 102, according to an embodiment of the present disclosure. As shown, the keying member 1206 may be an indented feature within the outer wall of the stem 212. The indentation 1207 may form an angle α that may conform to an outer surface of a mounting bracket of a component. For example, the angle α may be 96°. Alternatively, the angle α may be greater or less than 96°.

Figure 32:
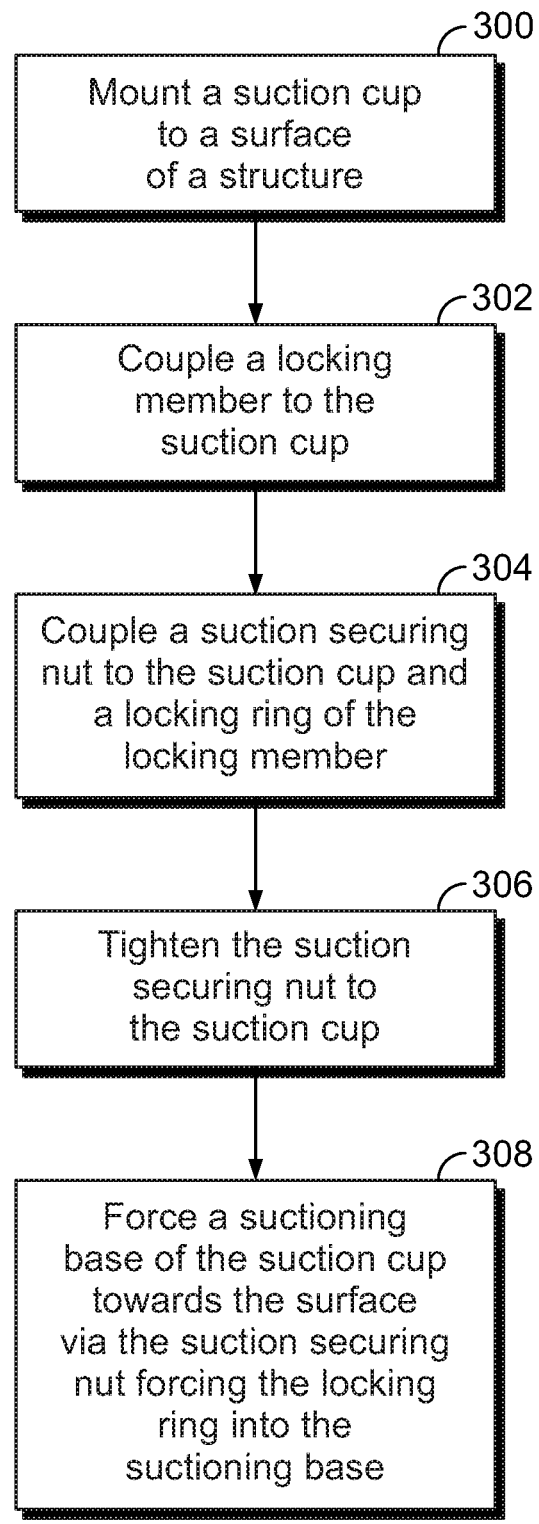
FIG. 32 illustrates a method of coupling a securing assembly to a surface of a structure, according to an embodiment of the present disclosure.

FIG. 32 illustrates a method of coupling a securing assembly to a surface of a structure, according to an embodiment of the present disclosure. Referring to FIGS. 1-32, at 300, the suction cup 102 is mounted to a surface of the structure 200. At 302, the locking ring 108 of the locking member 104 is coupled to the suction cup 102. At 304, the suction securing nut 106 is coupled to the suction cup 102 and the locking ring 108. At 306, the suction securing nut 106 is tightened in relation to the suction cup 102. At 308, the suctioning base 210 of the suction cup 102 is forced towards the surface of the structure 200 via the suction securing nut 106 forcing the locking ring 108 into the suctioning base 210.

In at least one embodiment, an intermediate structure, such as portion of a bracket, hanger, rope, string, and/or the like, may be disposed between the suction cup 102 and the locking ring 108, and/or the between the locking ring 108 and the suction securing nut 106. For example, a portion of a bracket may be hung around a portion of the suction cup 102 (such as the stem 212), a portion of the locking ring 108 (such as the rim 230), and/or a portion of the suction securing nut 106 (such as the wall 262).

In at least one embodiment, the securing assembly may secure to another component. For example, the securing assembly may be configured to secure to a bracket (such as a metal or plastic bracket) having a hole that is larger than a stem, for example, of the securing assembly. In this manner, the securing assembly may be retained by the bracket or a portion thereto. Further, a portion of a component, such as decorations (for example, garland, holiday lighting, etc.), wiring, draped materials, lanyards, and/or the like, may be hung from the component support hook 110, as described herein.

Figure 33:
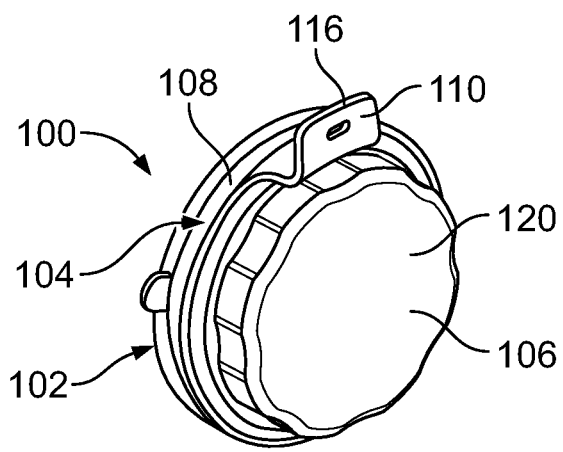
FIG. 33 illustrates a perspective front view of a securing assembly, according to an embodiment of the present disclosure.
Figure 34:
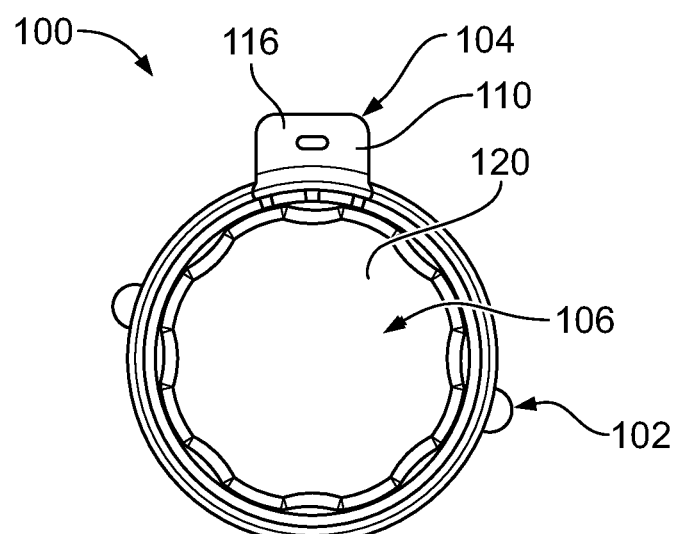
FIG. 34 illustrates a front view of the securing assembly of FIG. 33.
Figure 35:
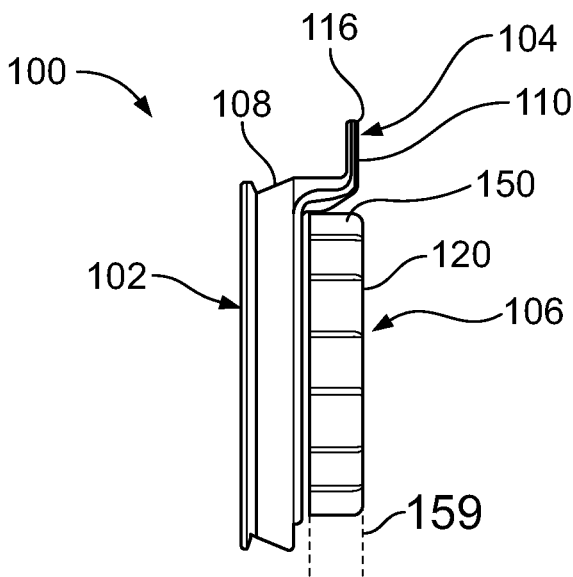
FIG. 35 illustrates a lateral view of the securing assembly of FIG. 33.
Figure 36:
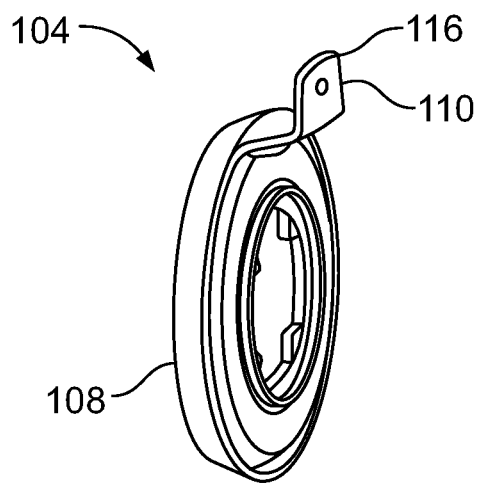
FIG. 36 illustrates a perspective front view of a locking member, according to an embodiment of the present disclosure.
Figure 37:
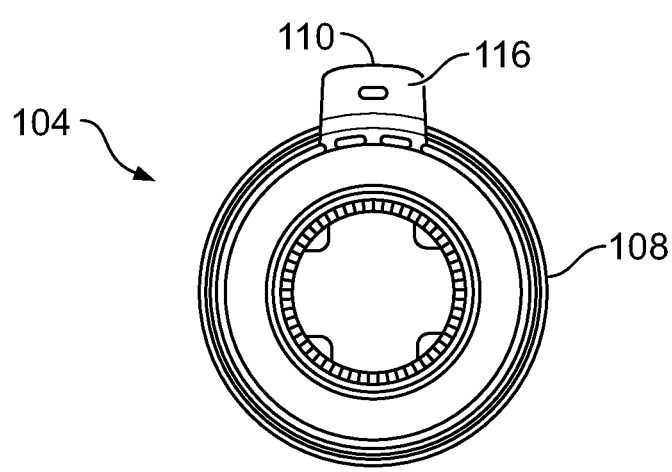
FIG. 37 illustrates a front view of the locking member of FIG. 36.
Figure 38:
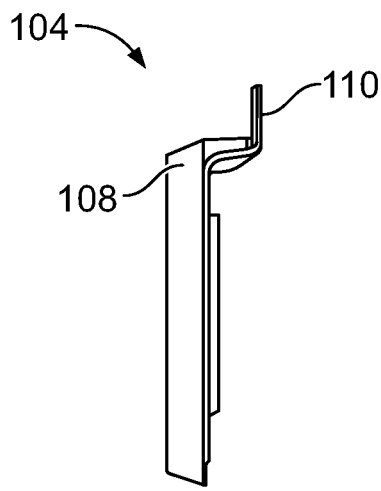
FIG. 38 illustrates a lateral view of the locking member of FIG. 36.

FIG. 33 illustrates a perspective front view of the securing assembly 100, according to an embodiment of the present disclosure. FIG. 34 illustrates a front view of the securing assembly 100 of FIG. 33. FIG. 35 illustrates a lateral view of the securing assembly 100 of FIG. 33. FIG. 36 illustrates a perspective front view of the locking member 104, according to an embodiment of the present disclosure. FIG. 37 illustrates a front view of the locking member 104 of FIG. 36. FIG. 38 illustrates a lateral view of the locking member 104 of FIG. 36.

The embodiment shown in FIGS. 33-38 is similar to the embodiment shown in FIGS. 1-9, except that the component support hook 110 of the locking member 104 is above the suction securing nut 106. For example, the component support hook 110 is disposed above the suction securing nut 106 such that the tab 116 extends away from the outer perimeter 150 of the suction securing nut 106. That is, the tab 116 is not disposed in front of the front surface 120 of the suction securing nut 106. In at least one embodiment, the tab 116 may not extend past a plane 159 in which the front surface 120 resides. In particular, the tab 116 may not outwardly extend past the plane 159 of the front surface 120. Optionally, the tab 116 may outwardly extend past the plane 159.

Referring to FIGS. 1-38, certain embodiments of the present disclosure provide a method of forming a locking member that configured to couple to a suction cup and a suction securing nut. The method includes extending a component support hook from a locking ring. The component support hook is configured to support at least a portion of a component. In at least one example, the method includes integrally forming the locking ring and the component support hook together to provide a single, unitary, monolithic structure.

As described herein, embodiments of the present disclosure provide robust securing assemblies that are configured to support components therefrom. Further, embodiments of the present disclosure provide securing assemblies that are configured to support components therefrom, and provide a reliable and strong coupling to surfaces of structures.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A locking member configured to couple to a suction cup and a suction securing nut, the locking member comprising:
   a locking ring including an inboard support base, an interior upstanding annular wall that upwardly extends from the inboard support base, and an interior ledge inwardly extending from the interior upstanding annular wall toward and about a central axis, wherein an interior edge of the interior ledge defines a central passage, and wherein the interior ledge includes a plurality of alternating teeth and recesses; and
   a component support hook extending from the locking ring, wherein the component support hook is configured to support at least a portion of a component.

2. The locking member of claim 1, wherein the locking ring and the component support hook are integrally formed together to provide a single, unitary, monolithic structure.

3. The locking member of claim 1, wherein the component support hook comprises:
   an extension beam; and
   a tab upwardly extending from the extension beam.

4. The locking member of claim 3, wherein the extension beam is configured to extend below an underside of the suction securing nut.

5. The locking member of claim 3, wherein the extension beam is configured to extend above the suction securing nut.

6. The locking member of claim 3, wherein the tab upwardly cants from a distal end of the extension beam at a ninety degree angle.

7. The locking member of claim 3, wherein the extension beam is configured to space the tab a distance in front of a front surface of the suction securing nut.

8. The locking member of claim 3, wherein the tab comprises a support passage extending between and through a front surface and a rear surface of the tab.

9. The locking member of claim 3, wherein an interior surface of the extension beam is arcuate.

10. The locking member of claim 3, wherein the tab comprises:
    a base upwardly extending from the extension beam; and
    a tip connected to the base,
    wherein the tab tapers down from the base to the tip.

11. The locking member of claim 1, wherein the locking ring further comprises an annular outer rim, and a beveled rim extending downwardly from the annular outer rim, wherein the beveled rim inwardly cants from the annular outer rim toward the central axis, wherein the inboard support base connects to an inner diameter of the beveled rim through an interior rim, and wherein an interior groove is formed between the annular outer rim, the beveled rim, and the interior rim.

12. A securing assembly configured to removably secure to a surface of a structure, the securing assembly comprising:
    a suction cup;
    a suction securing nut coupled to the suction cup; and
    a locking member coupled to the suction cup and the suction securing nut, the locking member comprising:
       a locking ring including an inboard support base, an interior upstanding annular wall that upwardly extends from the inboard support base, and an interior ledge inwardly extending from the interior upstanding annular wall toward and about a central axis, wherein an interior edge of the interior ledge defines a central passage, and wherein the interior ledge includes a plurality of alternating teeth and recesses; and
       a component support hook extending from the locking ring, wherein the component support hook is configured to support at least a portion of a component.

13. The securing assembly of claim 12, wherein the locking ring and the component support hook are integrally formed together to provide a single, unitary, monolithic structure.

14. The securing assembly of claim 12, wherein the component support hook comprises:
    an extension beam; and
    a tab upwardly extending from the extension beam.

15. The securing assembly of claim 14, wherein the extension beam extends below an underside of the suction securing nut.

16. The securing assembly of claim 14, wherein the extension beam extends above the suction securing nut.

17. The securing assembly of claim 14, wherein the tab upwardly cants from a distal end of the extension beam at a ninety degree angle.

18. The securing assembly of claim 14, wherein the extension beam spaces the tab a distance in front of a front surface of the suction securing nut.

19. The securing assembly of claim 14, wherein the tab comprises a support passage extending between and through a front surface and a rear surface of the tab.

20. The securing assembly of claim 14, wherein an interior surface of the extension beam is arcuate.

21. The securing assembly of claim 14, wherein the tab comprises:
    a base upwardly extending from the extension beam; and
    a tip connected to the base,
    wherein the tab tapers down from the base to the tip.

22. The securing assembly of claim 14, wherein the suction securing nut comprises a tactile outer perimeter including a regularly alternating series of protuberances and indentations.

\* \* \* \* \*